United States Patent [19]

Estienne

[11] 3,745,247

[45] July 10, 1973

[54] DISTORTION METER PROVIDING POLYGON PATTERN INDICATION OF DISTORTION LEVEL

[75] Inventor: Pierre Estienne, Rosny-sous-Bois, France

[73] Assignee: Compagnie Industrielle des Telecommunications, Cit-Alcatel, Paris, France

[22] Filed: Sept. 30, 1971

[21] Appl. No.: 185,058

[30] Foreign Application Priority Data

Sept. 30, 1973 France ............................7035404

[52] U.S. Cl. .............................................. 178/69 A

[51] Int. Cl. ............................................ H04l 25/02

[58] Field of Search ........... 178/69 A, 69 R, DIG. 4; 179/175.2 A; 325/363; 328/162

[56] References Cited

UNITED STATES PATENTS

| | | | |
|---|---|---|---|
| 2,712,038 | 6/1955 | Carver | 178/69 A |
| 2,307,237 | 1/1943 | Rea et al. | 178/69 A |
| 2,668,192 | 2/1954 | Cory | 178/69 A |
| 2,481,354 | 9/1949 | Schuler | 178/69 A |
| 2,535,118 | 12/1950 | Blashfield | 179/175.2 A |

*Primary Examiner*—Kathleen H. Claffy
*Assistant Examiner*—Douglas W. Olms
*Attorney*—Craig, Antonelli and Hill

[57] ABSTRACT

A distortion meter for indicating the distortion of a telegraphic signal includes a cathode ray tube, a deflection control arrangement for deflecting the electron beam to form the pattern of a closed polygon on the screen of the cathode ray tube, the length of the perimeter of the closed polygon corresponding to a prescribed degree of distortion and a beam control arrangement for controlling the electron beam to trace that portion of the polygon pattern corresponding to a measured degree of distortion.

11 Claims, 8 Drawing Figures

FIG. 1
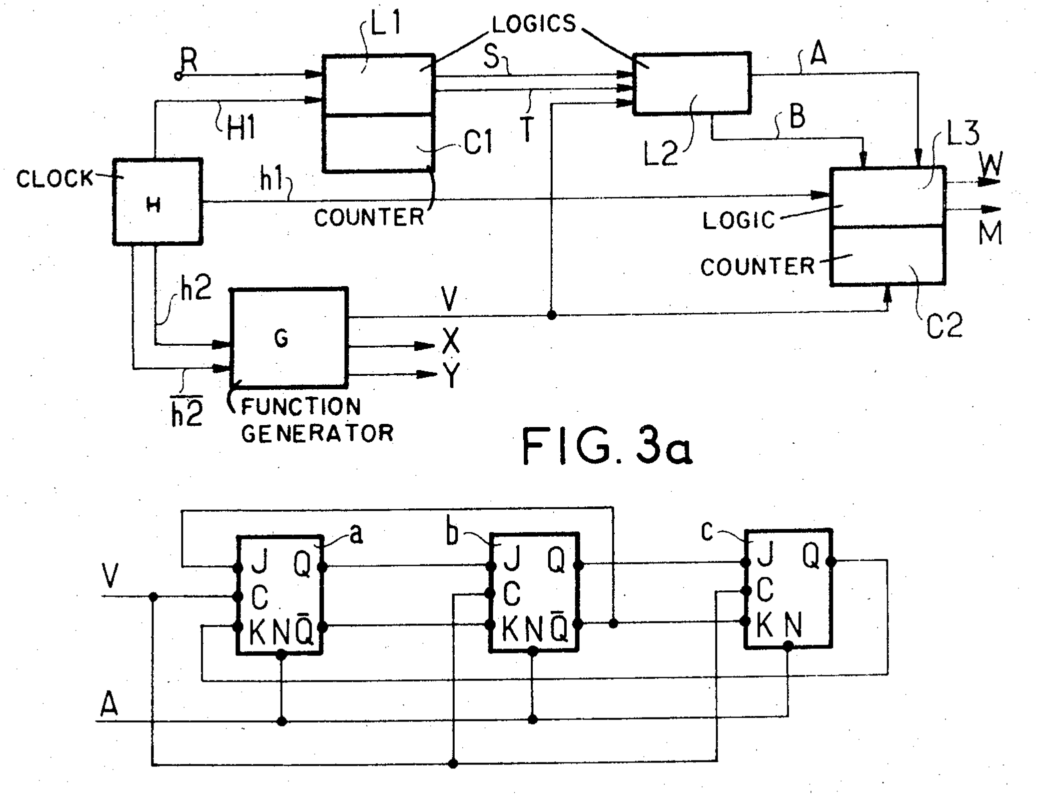
FIG. 1, FIG. 3a
FIG. 3b
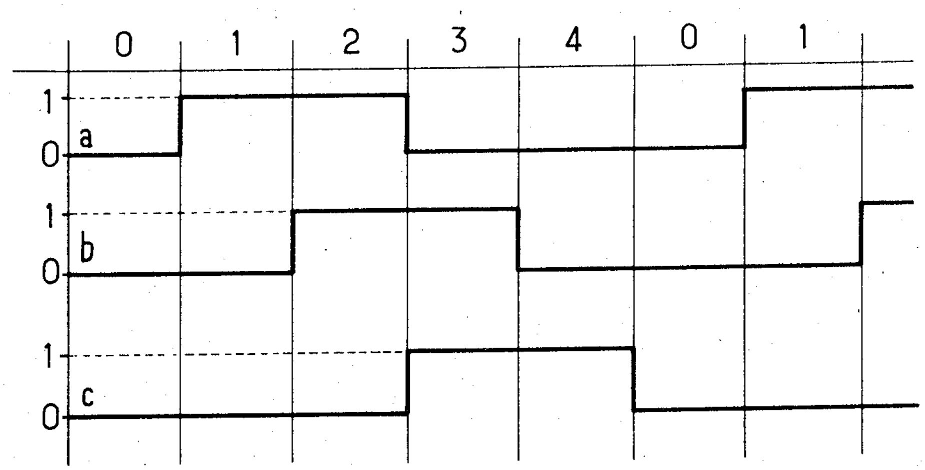

Patented July 10, 1973

3,745,247

4 Sheets-Sheet 2

Patented July 10, 1973 3,745,247

4 Sheets-Sheet 3

DISTORTION METER PROVIDING POLYGON PATTERN INDICATION OF DISTORTION LEVEL

The present invention concerns a distortion meter for indicating the degree of distortion of a signal by means of a trace on a cathode ray tube.

A telegraphic signal distortion meter has previously been described in which there is defined on the screen of a cathode ray tube a diamond-shaped configuration of points, the distance between the points of each pair being proportional, for example, to a distortion level of 5 percent. The degree of distortion of a received telegraphic signal is evaluated, and a spot is formed on the cathode ray tube screen. If the measured degree of distortion is an integral multiple of 5 percent, this spot coincides with one of those marked up on the screen. For intermediate distortion values, this spot will lie between two of the fixed spots, and the degree of distortion may be estimated by judging the distances of the spot from those on each side. However, this method gives relatively imprecise results.

In accordance with the present invention a distortion meter comprises a cathode ray tube, first circuitry for scanning an electron beam of the tube around a closed polygon on the screen, second circuitry for evaluating the degree of distortion of a received signal, and third circuitry controlled by the second circuitry to establish the electron beam at such a moment in each scan of the polygon and for such a period that there is traced on the screen a portion of the polygon whose length is proportional to the degree of distortion and one end of which is at a first fixed point on the screen, the total perimeter length of the polygon being proportional to a predetermined degree of distortion.

Figure 2:
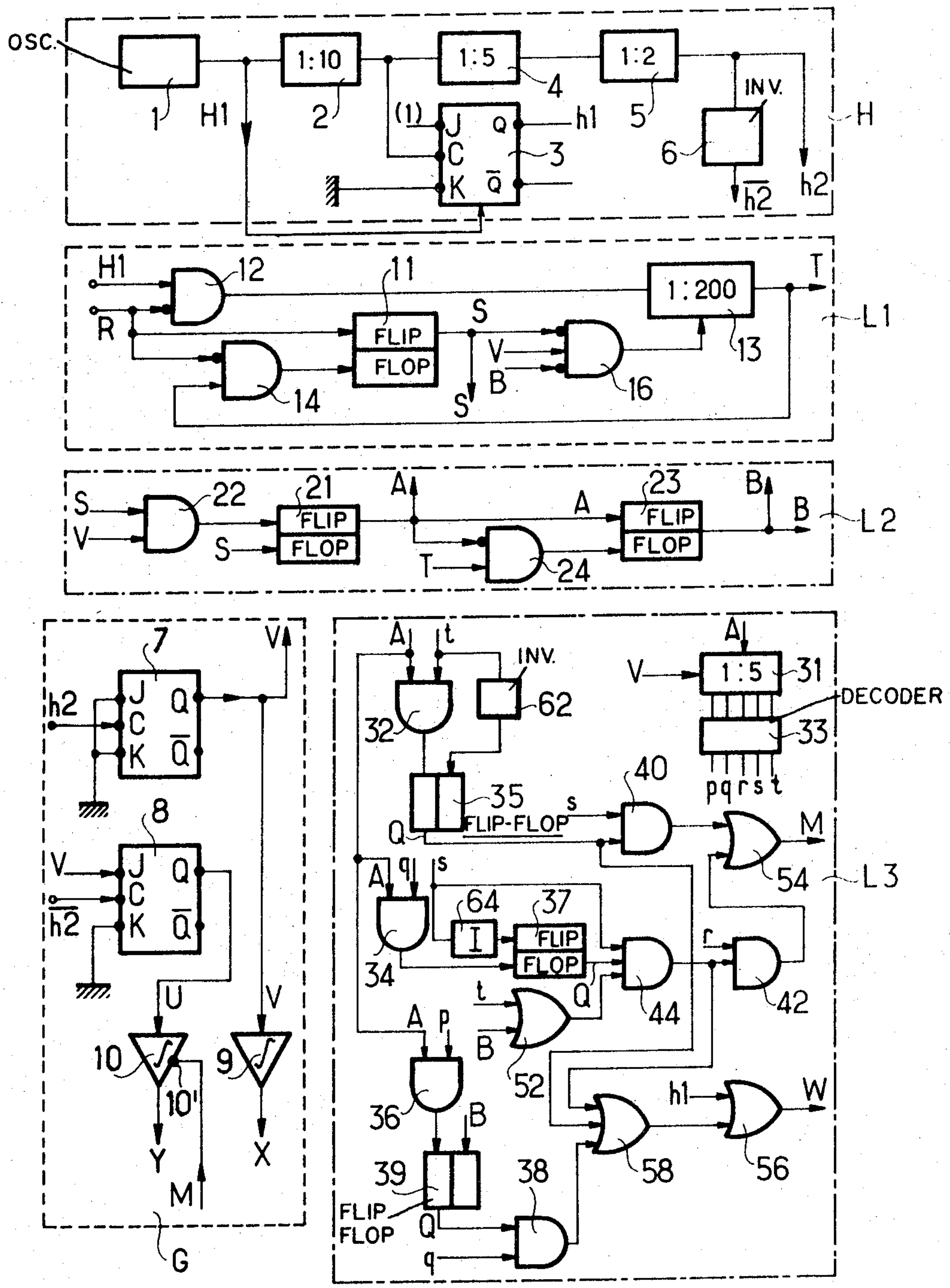

The invention will now be described in more detail, by way of example only and with reference to the accompanying diagrammatic drawings, in which FIG. 1 is an overall block diagram of the distortion meter;

FIG. 2 shows each of the blocks of FIG. 1 in more detail;

FIG. 3*a* is a circuit diagram of a counter of the meter and FIG. 3*b* is a wavefrom diagram relating to the counter; and FIGS. 4*a*, 4*b* and 5*a*, 5*b* are diagrams referred to in the description of the operation of the meter.

The distortion of a telegraphic signal consists of an increase or decrease in the period of the signal relative to a fixed telegraphic period. The degree of distortion may be defined by the percentage increase or decrease in this period.

The distortion meter defines on the screen of a cathode ray tube a closed polygon whose total perimeter has a length which is proportional to a predetermined degree of distortion. In the present example the polygon is a rhombus, and the length of each side indicates a distortion of 5 percent. The total length of the perimeter of the polygon thus indicates a distortion of 20 percent.

When the degree of distortion of the received signal exceeds the predetermined value, the meter traces on the screen a second and identical rhombus, the length of which is proportional to the difference between the degree of distortion of the received signal and the predetermined value of 20 percent defined by the fully traced first rhombus.

Positive distortion of the received signal, that is, an increase in length over the fixed telegraphic period, is indicated by the traced portion of the polygon commencing at a fixed origin of the polygon and extending clockwise around the polygon. Negative distortion, that is, a decrease in the period, is indicated by the traced portion of the polygon commencing at the origin and extending counter-clockwise around the polygon. The electron beam is always scanned clockwise around the polygon, the positive distortion indication being obtained by commencing the traced portion at the origin and the negative distortion indication by terminating the traced portion at the origin.

Referring to FIG. 1, clock circuitry H provides a first distortion signal H1 whose period represents 0.1 percent distortion, being equal to 0.1 percent of the fixed telegraphic period L. The clock circuitry H provides second and third distortion signals *h*1 and *h*2 whose periods are respectively equal to 1 percent and 10 percent of the period L. Finally, the clock circuitry H provides the signal $\overline{h2}$, consisting of the signal *h*2 inverted.

Signal *h*2 and its inversion are applied to a function generator G providing X and Y deflection signals to a cathode ray tube (not shown), and a reference signal V in the form of a square wave synchronous with the X and Y deflection signals.

First logic circuitry L1 including a modulo 200 counter C1 is connected to receive the distortion signal H1 and the received telegraphic signal R. The first logic circuitry L1 provides output signals S and T. These are applied to inputs of second logic circuitry L2 which also receives the reference signal V. It provides output signals A and B applied to respective inputs of third logic circuitry L3 including a modulo 5 counter C2. The third logic circuitry L3 also receives signals *h*1 and V, and provides output signals W and M.

The various signals mentioned in this description of FIG. 1 will be further defined later in the specification with reference to FIG. 4.

Referring to FIG. 2, the clock circuitry H includes a high stability oscillator 1 whose operational frequency is 1,000 times the telegraphic speed in Bauds. The oscillator 1 directly provides the distortion signal H1 with period of 0.1 percent of the fixed telegraphic period L. The oscillator output is applied to a divider 2 which divides by ten and whose output signal has a period of 1 percent of the telegraphic period. This output signal is applied to the C or clock input of a JK flip-flop 3 whose J input is held permanently at the logic value 1 and whose K input is held permanently at the logic value 0. The flip-flop 3 is connected to receive the signal H1 as a reset-to-zero signal, and its Q output provides the distortion signal *h*1. This has a period of 1 percent of the telegraphic period and a pulse width of 0.5 percent of that period.

The output of divider 2 is applied to the input of a divider by ten comprising a divider 4 which divides by five and a divider 5 which divides by two connected in cascade. This arrangement is chosen so that the output signal h2 of the divider by ten has a cyclic ratio of unity. The output of divider 5 passes through an inverter 6 to provide the signal $\overline{h2}$.

The function generator G has a first JK flip-flop 7 whose C or clock input is connected to receive the signal *h*2. Its J and K inputs are held permanently at the logic value 0, and its Q output provides the reference signal V.

A second JK flip-flop 8 has its C or clock input connected to receive the signal $\overline{h2}$ and its J input connected to receive the signal V. Its K input is held permanently at the logic value 0. Its Q output provides a signal U, consisting of a square wave in phase quadrature with the reference signal V.

The signal V is applied to the input of an integrator amplifier 9 providing at its output a signal X in the form of a regular sawtooth wave form. The signal U is applied to the input of a second integrator amplifier 10 providing at its output a signal Y in the form of a regular sawtooth wave form in phase quadrature with the signal X. These signals X and Y are applied to the cathode ray tube (not shown) as X and Y deflection signals. Their combined effect is to continuously scan the electron beam of the tube around a closed rhombus having one pair of opposite corners on a vertical axis and the other pair on a horizontal axis. The integrator amplifier 10 has an input 10' to which the signal M is applied.

The first logic circuitry L1 includes a first AND-gate 12 to one input of which is applied the signal H1. The second input of gate 12 is an inhibit input and is connected to receive the received telegraphic signal R. The output of gate 12 is connected to the input of a modulo 200 counter 13 being that referenced C1 in FIG. 1. The output of this counter 13 is the signal T.

A second AND-gate 14 is connected to receive the signal R on an inhibit input and the signal T on a normal input. Its output is connected to the reset input of a flip-flop 11 whose drive input is connected to receive the signal R. The output of flip-flop 11 provides the signal S, which signal is applied to a first inhibit input of a third AND-gate 16. A second inhibit input of this gate receives the signal B, and a normal input the signal V. The output of gate 16 is applied to a reset-to-zero input of the counter 13.

The second logic circuitry L2 includes a first AND-gate 22 connected to receive the signals S and V. Its output is applied to the drive input of a flip-flop 21 whose reset input receives the signal S. The output of flip-flop 21 provides the signal A, which is applied to the drive input of a further flip-flop 23. The signal A is also applied to an inhibit input of a second AND-gate 24 which receives on a normal input the signal T. The output of gate 24 is connected to the reset input of flip-flop 23. The output of flip-flop 23 provides the signal B.

The third logic circuitry L3 includes a modulo 5 counter 31, being that references C2 in FIG. 1. Its counting input is connected to receive the signal V and its reset input the signal A. The counter 31 is connected to a decoder 33 with five inputs labeled *p*, *q*, *r*, *s* and *t*. Each of these is energized for a corresponding counter state, *p* for state 0, *q* for state 1, *r* for states 1 and 2, *s* for states 2 and 3, and *t* for states 3 and 4.

A first AND-gate 32 is connected to receive the signals A and *t*. Its output is connected to the drive input of a flip-flop 35 whose reset input is connected to receive the signal *t* through an inverter 62. The output of flip-flop 35 is connected to one input of an AND-gate 40 whose other input is connected to receive the signal *s*. The output of gate 40 is connected to a first input of an OR-gate 54 whose output provides the signal M.

An AND-gate 34 is connected to receive signals A and *q*. Its output is connected to the drive input of a flip-flop 37 whose reset input is connected to receive the signal s through an inverter 64. The output of flip-flop 37 is connected to one input of an AND-gate 44 a second input of which is connected to receive the signal *s*. The third input of gate 44 is connected to the output of an OR-gate 52 connected to receive signals B and *t*.

The output of gate 44 is connected to one input of an AND-gate 42 whose second input is connected to receive the signal *r* and whose output is connected to the second input of gate 54.

An AND-gate 36 is connected to receive signals A and *p* and its output is connected to the drive input of a flip-flop 39. The reset input of flip-flop 39 is connected to receive the signal B. The output of flip-flop 39 is connected to one input of an AND-gate 38 whose other input receives the signal *q*. The output of gate 38 is connected to one input of an OR-gate 58 whose second and third inputs are respectively connected to the output of flip-flop 35 and the output of gate 44.

The output of gate 58 is connected to one input of an OR-gate 56 whose other input is connected to receive the signal *h*1. The output of gate 56 provides the signal W.

FIG. 3A shows the modulo 5 counter 31 (C2 in FIG. 1). It consists of three JK flip-flops labeled *a*, *b*, and *c*. The signal V is applied to all three clock inputs C, and the signal A to all three reset inputs N. The Q output of flip-flop *a* is connected to the J input of flip-flop *b* whose Q output is connected to the J input of flip-flop *c*. The other output of flip-flop a is connected to the K input of flip-flop *b*, and that of flip-flop *b* is connected to the K input of flip-flop *c* and the J input of flip-flop *a*. The Q output of flip-flop *c* is connected to the K input of flip-flop *a*.

FIG. 3B shows the logic values at the Q outputs of flip-flops *a*, *b* and *c* for each of the five counter states 0, 1, 2, 3 and 4. From FIG. 3B, the following conditions are readily deduced:

$$0 = \overline{a}.\overline{b}.\overline{c}$$
$$1 = a.\overline{b}.\overline{c}$$
$$1 + 2 = a$$
$$2 + 3 = b$$
$$3 + 4 = c$$

The counter states 1 + 2, 2 + 3 and 3 + 4 are thus readily decoded.

Figure 4A:
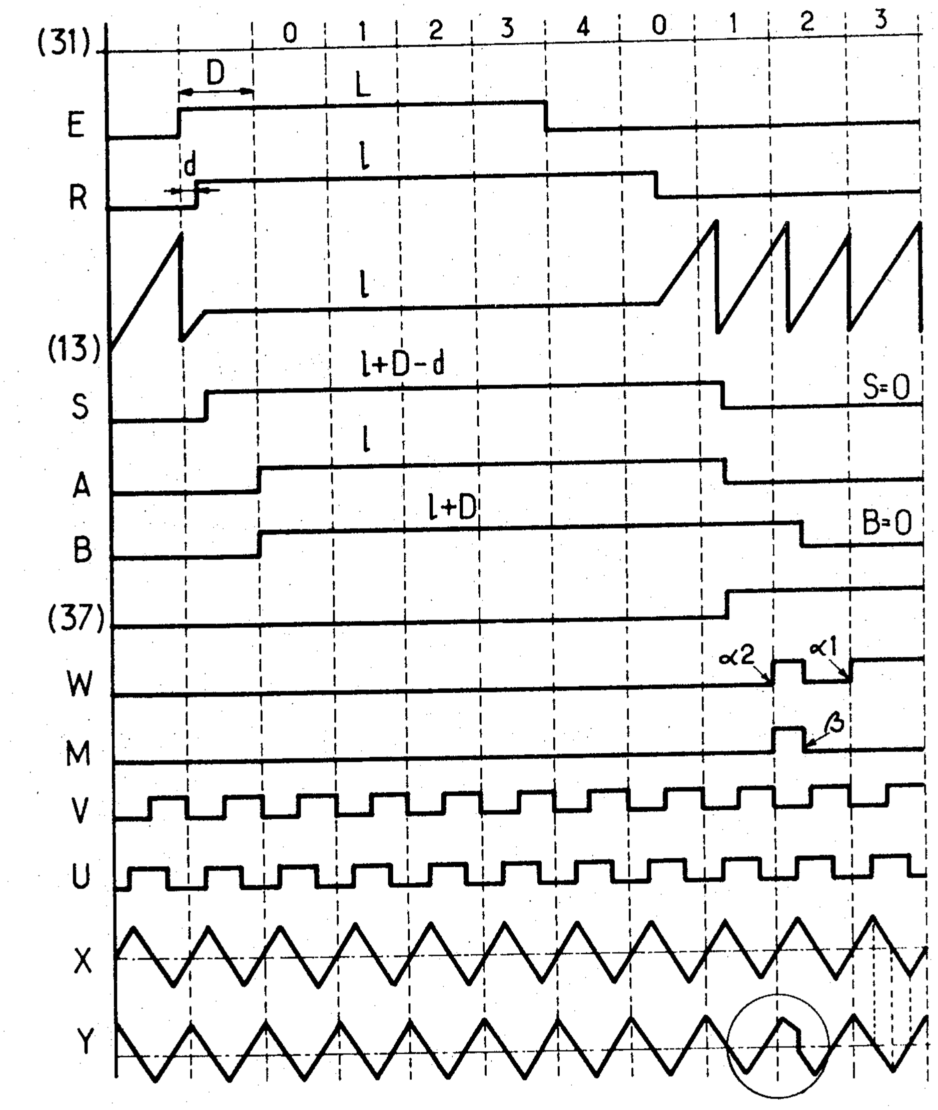

FIG. 4A shows the various signals so far defined, in the particular case of a distortion level of 25 percent. The first or uppermost line of FIG. 4A shows the successive states of the counter 31. Each state lasts a period D.

The second line shows the reference signal E of duration $L = 5D$.

The third line shows the received signal R whose duration is 1 and which starts a period d after the reference signal E.

The fourth line shows the output of the modulo 200 counter 13, increasing from 0 t0 200 in each period *D*. The count is arrested on the appearance of the signal R and remains fixed for the duration 1 of that period. The count is then completed, and as will be seen from the figure the moment at which the count of 200 is reached occurs a period d after the commencement of the corresponding period *D*.

The fifth line shows the signal S. This starts synchronously with the signal R, but its duration is $1 + D - d$.

The sixth line shows the signal A whose duration is 1 and which begins synchronously with the first period of signal V (see below) following the start of signal S.

The seventh line shows the signal B which begins synchronously with the signal A and whose duration is 1 + *D*.

The eighth line shows the output signal of the flipflop 37 of the third logic circuitry L3.

The ninth line shows the output signal W of the third logic circuitry L3, this signal being applied to the electron gun of the cathode ray tube to provide the electrode beam.

The 10th line shows the signal M provided by the third logic circuitry L3 and applied to the Y deflection system of the cathode ray tube to shift the rhombus origin vertically by a predetermined amount.

The 13th and 14th lines of FIG. 4A respectively show the X and Y deflection signals.

The 11th line shows the reference signal V, consisting of a square wave with equal mark-space ratio, synchronous with signals X and Y and with its pulses situated in the second half of each period *D*.

The 12th line shows the reference signal U identical to but in phase quadrature with the signal V.

Figure 4B:
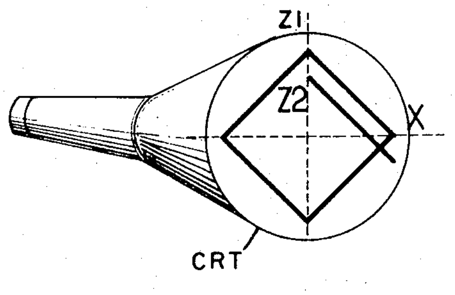

FIG. 4B shows the trace on the screen of the cathode ray tube CRT. A first complete rhombus, indicating 20 percent distortion, is traced with origin Z1. A second rhombus is traced from an origin Z2, but as the excess distortion over 20 percent is only 5 percent, only one side of the second rhombus is traced. The first rhombus beings at point α 1 indicated in the signal W and the second at point α 2.

Figure 5A:
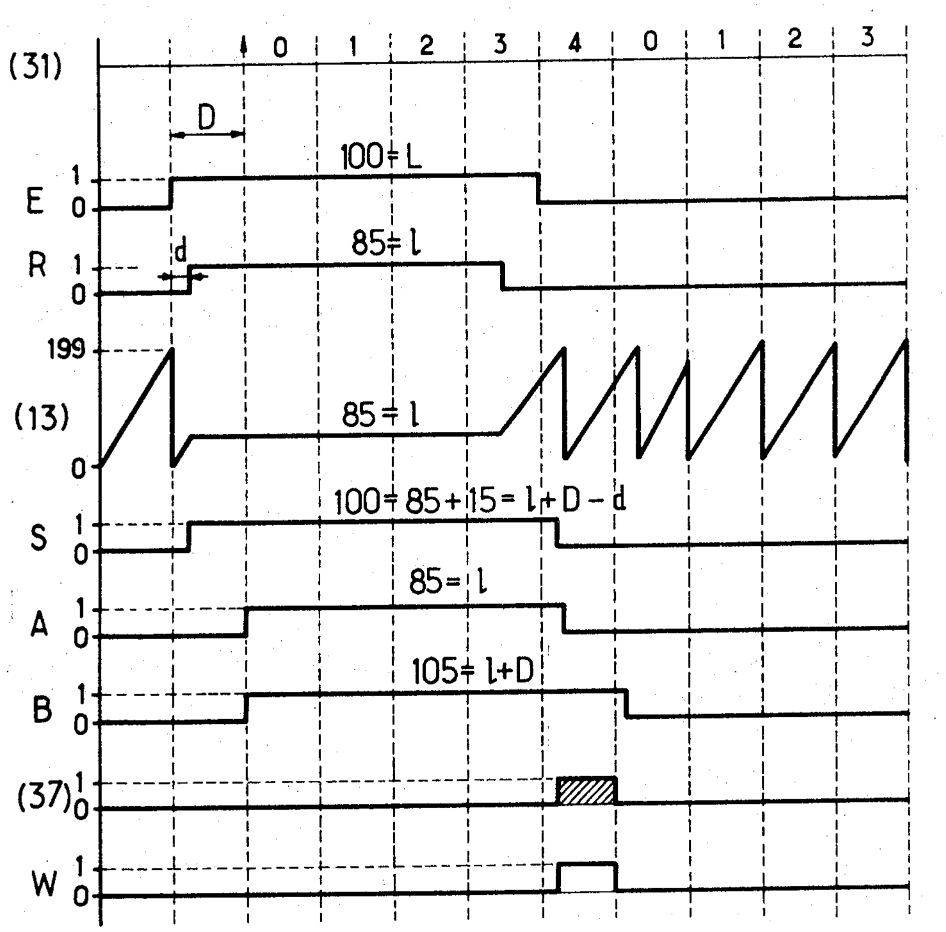

FIG. 5A shows in its first line the output of counter 31 in the case of a distortion of 15 percent in the opposite sense, that is to say a shortening of the period 1 with respect to the reference period L. The second and third lines of FIG. 5A show the reference and received signals E and R respectively, and the fourth line shows the output of the modulo 200 counter 13. The fifth, sixth and seventh lines show respectively the signals S, A and B, the eighth lines shows the output of flip-flop 37 of the third logic circuitry L3, and the final line shows the signal W.

Figure 5B:
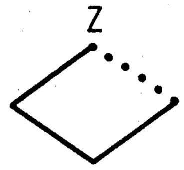

FIG. 5B shows the trace of the cathode ray tube, which apparently starts at an origin Z and extends anticlockwise around the rhombus. This is obtained, as is clearly seen in FIG. 5A, by starting the scan at a time such that it terminates at the origin Z, the beam being in fact scanned clockwise around the rhombus.

Those sides of the rhombus which are not traced by the electron beam are marked by points spaced by 1 percent distortion. These result from the signal *h*1 applied to gate 56 of the third logic circuitry L3. The pulses of this signal are superimposed on the signal W, but have not been shown in FIG. 5A for the sake of clarity.

The distortion measurement process evolves as follows:

A distortion-free telegraphic signal is applied to an element whose distortion level is to be determined. The element provides at its output a distorted version of the initial signal. The distortion-free signal is that shown at E in FIGS. 4A and 5A. The distorted signal R is subjected to first and second types of distortion, i.e., it is either longer (FIG. 4A) or shorter (FIG. 5A) than the distortion-free signal E, and is delayed by the interval *d*.

The logic circuitry of the distortion meter replaces the distorted signal R with the signal A whose duration is the same but whose start coincides with the moment at which the electron beam of the cathode ray tube (if present) would pass through the origin Z of the rhombus trace.

The modulo 5 counter divides the period L of the distortion-free signal into five equal segments of duration D. The counter is reset to 0 at the start of signal A. The signal W applied to the electron gun of the cathode ray tube depends on the state of this counter at the end of the signal A:

If the signal A terminates in state 0 of the counter, there is a positive distortion of between 0 and 20 percent.

If the signal A terminates in the 1 state of the counter, there is a positive distortion of between 20 and 40 percent.

If the signal A terminates in counter state 4, there is a negative distortion of between 0 and 20 percent.

If the signal A terminates in state 3 of the counter, there is a negative distortion of between 20 and 40 percent.

In dependence on the counter state at the end of signal A, a portion of the first rhombus trace for the entire first rhombus followed by a portion of the second rhombus are traced on the screen. The distortion meter is limited to the indication of distortion levels from 0 to 40 percent, as it is considered impractical to attempt to evaluate higher distortion levels.

What we claim is:

1. A distortion meter for indicating the distortion of an output signal from a device receiving an input signal comprising a cathode ray tube including beam generating means for generating an electron beam in the cathode ray tube and deflection means for scanning the electron beam across a screen, first circuit means connected to said deflection means for scanning the electron beam of the cathode ray tube in a pattern forming a closed polygon on the screen, second circuit means for evaluating the degree of distortion of said output signal, and third circuit means controlled by said second circuit means for energizing said beam generating means to establish the electron beam at such a moment in each scan around the closed polygon and for such a period that there is traced on the screen a portion of the polygon whose length is proportional to the evaluated degree of distortion beginning at a first fixed point on the screen, said first circuit means including scanning control means for controlling the scanning so that the total length of the perimeter of the polygon is proportional to a predetermined degree of distortion.

2. A distortion meter as claimed in claim 1, including fourth circuit means responsive to an indication from said second circuit means that the degree of distortion of said output signal exceeds said predetermined value for actuating said first and third circuit means to trace a portion of a second identical polygon pattern on said screen beginning at a second fixed point spaced from said first fixed point and having a length which is proportional to the difference between the degree of distortion of said output signal and said predetermined value.

3. A distortion meter is claimed in claim 2, for telegraphic signals subjected to first and second types of distortion comprising respectively an increase and a decrease in the signal period with respect to a fixed reference period, said second circuit means including clock circuit means for providing first, second and third standard distortion signals with respective periods of 0.1 percent, 1 percent, and 10 percent of a reference period.

4. A distortion meter as claimed in claim 3, wherein said first circuit means includes function generator means for providing X and Y deflection signals to the deflection means of said cathode ray tube to scan the electron beam in said polygon pattern in synchronism with a square wave reference signal generated in response to said third standard distortion signal.

5. A distortion meter as claimed in claim 4, including first logic means connected to receive said output signal, said first standard distortion signal and a first intermediate signal whose duration is the sum of the signal period and the polygon pattern scan time for providing a second intermediate signal which commences synchronously with said output signal and whose duration is equal to that of the first intermediate signal minus the delay between the start of said output signal and the start of said polygon pattern scan.

6. A distortion meter as claimed in claim 5, wherein said first logic means further includes first counter means connected to receive said first standard distortion signal only during times when said output signal is not received for counting from zero to its full capacity during each polygon pattern scan period.

7. A distortion meter as claimed in claim 6, including second logic means connected to receive said second intermediate signal, said square wave reference signal and the output of said first counter means for providing said first intermediate signal and a third intermediate signal whose duration is equal to said output signal period and which starts synchronously with the first polygon pattern scan start after the start of said output signal.

8. A distortion meter as claimed in claim 7, said third circuit means including third logic means connected to receive said first and third intermediate signals and said square wave reference signal for providing a first control signal for energizing said beam generating means and a second control signal for actuating said beam deflection means to effect the spacing of said first and second fixed points, including second counter means in which each count value is maintained for one polygon pattern scan period, and means for resetting said second counter to zero at the start of said third intermediate signal, third logic means providing a first signal synchronously with which the electron beam is established and a second signal for deflecting the electron beam to effect the spacing of the first and second fixed points.

9. A distortion meter as claimed in claim 6, in which the first counter is a modulo 200 counter.

10. A distortion meter as claimed in claim 8, in which the second counter is a modulo 5 counter.

11. A distortion meter as claimed in claim 2, in which said output signal is subjected to first and second types of distortion, said second circuit means including means for energizing said beam generating means to respectively indicate said first and second types of distortion by traced portions extending clockwise and counter clockwise from said first or second fixed points, said first circuit means scanning the electron beam around the polygon pattern in one sense only, the clockwise and counter clockwise indications being respectively obtained by commencing and terminating the trace at the fixed point.

* * * * *